UNITED STATES PATENT OFFICE 2,132,468

PRINTING INKS

Archibald Alwyn Harrison and Stephen Hellicar Oakeshott, Blackley, Manchester, England, assignors to Imperial Chemical Industries Limited, a corporation of Great Britain No Drawing. Application July 30, 1934, Serial No. 737,672. In Great Britain August 3, 1933

6 Claims. (Cl. 134—35)

According to the present invention, we manufacture new spirit printing inks by incorporating together an alkyl cellulose, an alcohol, a spirit soluble colouring matter, and if desired an additional ingredient or ingredients suitable for spirit printing inks, such as, an alcohol-soluble adhesive, e. g., shellac.

Also according to the invention, we manufacture new dry preparations for the manufacture of the new inks by incorporating together the above mentioned solid ingredients.

Our invention also includes the said new preparations, new spirit printing inks and their application in printing.

As alkyl celluloses, we mean methyl, ethyl, propyl, butyl and glycol celluloses. As alcohol we mean ethyl alcohol and methyl alcohol, especially methylated spirit. As colouring matters we mean spirit-soluble colours.

In carying the invention into practical effect known methods for making spirit printing inks may be employed and the alkyl cellulose incorporated at any convenient stage. For instance a spirit-soluble colour and an alkyl cellulose may be incorporated into a dry preparation and this preparation dissolved in spirit at some convenient stage before printing.

The new inks while retaining substantially all the advantages of the same spirit inks in which there is no alkyl cellulose, such as quick-drying capacity, give prints of improved strength of shade, brightness, opacity and fastness, while at the same time they do not penetrate the material printed to the same depth, which is an advantage for applications such as printing paper on both sides.

The new inks are particularly suitable for printing from rubber stereos on rotary machines, and they may be used also for printing from metal type. In general the thinner, i. e., less viscous inks are to be prefered for rubber type and the thicker, or more viscous inks for metal type. In the latter case non-absorbent surfaces like regenerated cellulose or nitro cellulose films, and book cloths are readily covered.

The following examples, in which the parts are by weight, illustrate but do not limit the invention.

Example 1

Forty (40) parts of Rotor Green Y (Rotor being a registered trade-mark) and 5 parts of ethyl cellulose are dissolved in 155 parts of methylated spirit. Methylated spirit is the name given to a commercial brand of ethyl alcohol, consisting of approximately 93.5% by weight or 95.8% by volume of ethyl alcohol, methyl alcohol denaturant (wood spirit), and a small quantity of pyridine to make it obnoxious for drinking purposes. The resulting ink when printed from rubber stereos in a rotary machine gives impressions of improved brilliance, opacity, and colour strength. Thus prints from this 20% ink are equal in strength of shade to those from similar 30–40% inks not containing ethyl cellulose.

Example 2

Twenty (20) parts of Victoria Blue R 275 (Colour Index No. 728) and 5 parts of ethyl cellulose (as used in Example 1) are dissolved in 175 parts of methylated spirits. This ink shows improved properties similar to those of Example 1, except for the water-fastness attributable to the use of the Rotor colours.

Example 3

Thirty-six (36) parts of Rotor Blue B and 4 parts of ethyl cellulose (as used in Example 1) are ground together in the dry state. The resulting composition is made into ink by dissolving in 360 parts of hot methylated spirits in a steam-jacketed pan.

Example 4

Three (3) parts of ethyl cellulose are dissolved in 50 parts of methylated spirit to which are then added 2 parts of Duranol Orange G dissolved in 50 parts of methylated spirit.

Other dyes which may be used in place of Duranol Orange G are Duranol Violet 2R., Duranol Brilliant Violet B., Dispersol Fast Yellow A., Dispersol Fast Red A., Dispersol Fast Orange B., Duranol and Dispersol are registered trademarks.

Example 5

Eighty-Seven (87) parts of methylated spirit, 8 parts of ethyl cellulose, 20 parts of white shellac, and 45 parts of titanium oxide are milled to a smooth paste. There are then added 26 parts of ethyl cellulose dissolved in 60 parts of methylated spirit followed by 16 parts of Rotor Violet BG. dissolved in 64 parts of methylated spirit. Finally there is added 33 parts of methylcyclohexanol oxalate, and the whole mixed thoroughly.

Example 6

Eighty-seven (87) parts of methylated spirit, 8 parts of ethyl cellulose, 20 parts of white shellac, and 45 parts of titanium oxide are milled to a smooth paste. There are then added 26 parts of ethyl cellulose dissolved in 60 parts of methylated spirit followed by 8 parts of Methyl Violet 2B. and 8 parts of Rotor Violet BG. dissolved in 64 parts of methylated spirit. Finally there is added 33 parts of methylcyclohexanone and the whole mixed thoroughly.

We claim:

1. A printing ink consisting of 34 parts ethyl cellulose, 20 parts white shellac, methylated spirit, titanium oxide, ethyl cellulose dye and methylcyclohexanone.

2. A printing ink consisting of 34 parts ethyl cellulose, 20 parts white shellac, a spirit solvent, a dye for ethyl cellulose, and a pigment.

3. A quick-drying, non-penetrating spirit printing ink containing the combination of a spirit solvent, an alkyl cellulose, and a spirit-soluble dye within the approximate ratios of solvent to alkyl cellulose of 90 to 1 and 7 to 1, and of solvent to dye of 50 to 1 and 10 to 1.

4. A quick-drying, non-penetrating spirit printing ink containing the combination of a spirit solvent, ethyl cellulose, and a spirit-soluble dye within the approximate ratios of solvent to ethyl cellulose of 90 to 1 and 7 to 1, and of solvent to dye of 50 to 1 and 10 to 1.

5. A quick-drying, non-penetrating spirit printing ink containing the combination of a spirit solvent, an alkyl cellulose, and a spirit-soluble dye within the approximate ratios of solvent to alkyl cellulose of 90 to 1 and 7 to 1.

6. A quick-drying, non-penetrating spirit printing ink containing the combination of a spirit solvent, ethyl cellulose, and a spirit-soluble dye within the approximate ratios of solvent to ethyl cellulose of 90 to 1 and 7 to 1.

ARCHIBALD ALWYN HARRISON.
STEPHEN HELLICAR OAKESHOTT.